(12) United States Patent
Yim

(10) Patent No.: US 6,778,382 B2
(45) Date of Patent: Aug. 17, 2004

(54) DISPLAY CONNECTOR FOR ELECTRONIC DEVICE

(75) Inventor: Hong-kyun Yim, Suwon (KR)

(73) Assignee: Samsung Electronics Company, Ltd., Kyungki-Do (KR)

(*) Notice: Subject to any disclaimer, the term of this patent is extended or adjusted under 35 U.S.C. 154(b) by 181 days.

(21) Appl. No.: 09/839,417

(22) Filed: Apr. 23, 2001

(65) Prior Publication Data

US 2001/0048587 A1 Dec. 6, 2001

(30) Foreign Application Priority Data

May 18, 2000 (KR) ........................................ 2000-26707

(51) Int. Cl.[7] ................................................ G06F 1/16
(52) U.S. Cl. ........................................ 361/681; 345/82
(58) Field of Search ........................... 345/82; 361/680, 361/681; 439/490, 31; 708/110; 16/203, 254, 261; 398/131

(56) References Cited

U.S. PATENT DOCUMENTS

| | | | | |
|---|---|---|---|---|
| 4,978,317 A | * | 12/1990 | Pocrass | 439/490 |
| 5,109,354 A | * | 4/1992 | Yamashita et al. | 708/110 |
| 5,168,429 A | * | 12/1992 | Hosoi | 361/680 |
| 5,253,139 A | * | 10/1993 | Satou | 361/681 |
| 5,507,072 A | * | 4/1996 | Youn | 16/261 |
| 5,542,850 A | * | 8/1996 | Frantz | 439/31 |
| 5,704,094 A | * | 1/1998 | Hartigan et al. | 16/303 |
| 5,724,704 A | * | 3/1998 | Seo | 16/254 |
| 5,796,576 A | * | 8/1998 | Kim | 361/681 |
| 5,805,415 A | * | 9/1998 | Tran et al. | 361/681 |
| 5,949,565 A | * | 9/1999 | Ishida | 398/131 |
| 6,028,764 A | * | 2/2000 | Richardson et al. | 361/681 |

FOREIGN PATENT DOCUMENTS

| | | |
|---|---|---|
| JP | 03-094318 A | 4/1991 |
| JP | 4-55619 U | 5/1992 |
| JP | 2000-010654 A | 1/2000 |

\* cited by examiner

Primary Examiner—Chanh Nguyen
Assistant Examiner—Uchendu O. Anyaso
(74) Attorney, Agent, or Firm—Sughrue Mion, PLLC

(57) ABSTRACT

A display connector includes a body having a mounting portion on one surface, a detachably installed display member, a pair of rotation pins in the mounting portion, a pair of rotating fixing brackets for the rotation pins, a locking feature, an unlocking feature, and a rotating light emitter coupled to either of rotation pin with a laser diode array. Each diode in the array independently radiates light according to a driving signal. A light receiving module in the display faces the light emitting module when the display is mounted on the body, and has a photo diode array for receiving the output of the laser diode array. The picture signal is transmitted from the body to the rotatably-connected display using the light.

6 Claims, 4 Drawing Sheets

DISPLAY CONNECTOR FOR ELECTRONIC DEVICE

BACKGROUND OF THE INVENTION

1. Field of the Invention

The present invention relates to an electronic device having a display, and more particularly, to a display connector for an electronic device configured such that the display is detachable from the body of the electronic device.

2. Description of the Related Art

In general, a portable electronic device having a display, such as a notebook computer, a web video phone, a digital video camera, or the like, has a display integrally formed with a body. Herein, the display may also be referred to as a display member for the sake of generality and linguistic convenience. FIG. 1 is a perspective view of a conventional notebook computer as an example of an electronic device having an integral display member.

Referring to FIG. 1, the notebook computer includes a body 1 having a computer system and a display member 3 for displaying an image according to a picture signal from the body 1.

The body 1 includes an input device for inputting manipulation commands, such as a keyboard or a mouse, a hard disk drive, a CD-ROM, a modem, peripheral devices such as a LAN card, or an acoustic device for providing an audio signal. The display member 3 is an output device for outputting information supplied from the body 1 in the form of an image. The display member 3 is hinged at a side of the body 1 so as to be capable of being opened or closed. Also, the display member 3 is electrically connected to the body 1 by a cable 5.

In the notebook computer having the aforementioned configuration, since the body 1 and the display member 3 are directly hinged and connected to each other by the cable 5, they are not separable. During use of the notebook computer, the body or display member thereof may become defective. Also, when the service life of the body or display member is at an end, or when the display member is intended to be replaced with a new one having a larger screen, the replacement of display members cannot be done directly by a user. Also, the cable is exposed outside, resulting in an undesirable outer appearance.

SUMMARY OF THE INVENTION

To solve the above problems, it is an objective of the present invention to provide a display connector of an electronic device configured such that a display member is detachable from a body.

Accordingly, to achieve the above objective, there is provided a display connector including a body having a mounting portion on one surface, a display member for receiving a picture signal from the body and displaying a corresponding image, which is detachably installed with respect to the body, a pair of rotation pins rotatably installed in the mounting portion, a pair of fixing brackets provided in the display member to correspond to the rotation pins, and coupled to the rotation pins when the display member and the body are connected so as rotate along with the rotation pins, locking means for maintaining connection between the fixing brackets and the rotation pins, unlocking means for canceling connection between the fixing brackets and the rotation pins, a light emitting module coupled to either of the rotation pins to be rotated therewith, and having a laser diode array for independently radiating light according to driving signal, and a light receiving module installed in the display member to be locked to face the light emitting module when the display member is mounted on the body, and having a photo diode array for independently performing a photoelectric conversion on incident light, wherein the display member is detachably installed with respect to the body, and the picture signal is transmitted from the body to the display member using light while the display member rotatably connected to the body.

The locking means may include a locking groove formed in a head of the rotation pin, a locking member movably installed in the display member to move toward and couple to the locking groove when the display member is connected to the body, and a spring for elastically pressing the locking member toward the locking groove.

Also, the unlocking means may include a guide hole formed in the display member, and an unlocking lever having one end coupled to the locking member and the other end slidably installed in the guide hole.

Preferably, the mounting portion protrudes from one plane of the body, and the rotation pins are symmetrically installed at both ends of the mounting portion.

The light emitting module is preferably installed between the pair of rotation pins.

Also, each of the rotation pins preferably has a predetermined fastening portion having a rectangular cross section at one end, each of the fixing brackets preferably has a predetermined fastening groove formed to correspond to the shape of the cross section of the fastening portion, and the rotation pin and the fixing bracket rotate together in a state where the fastening portion and the fastening grooves are connected.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 1:
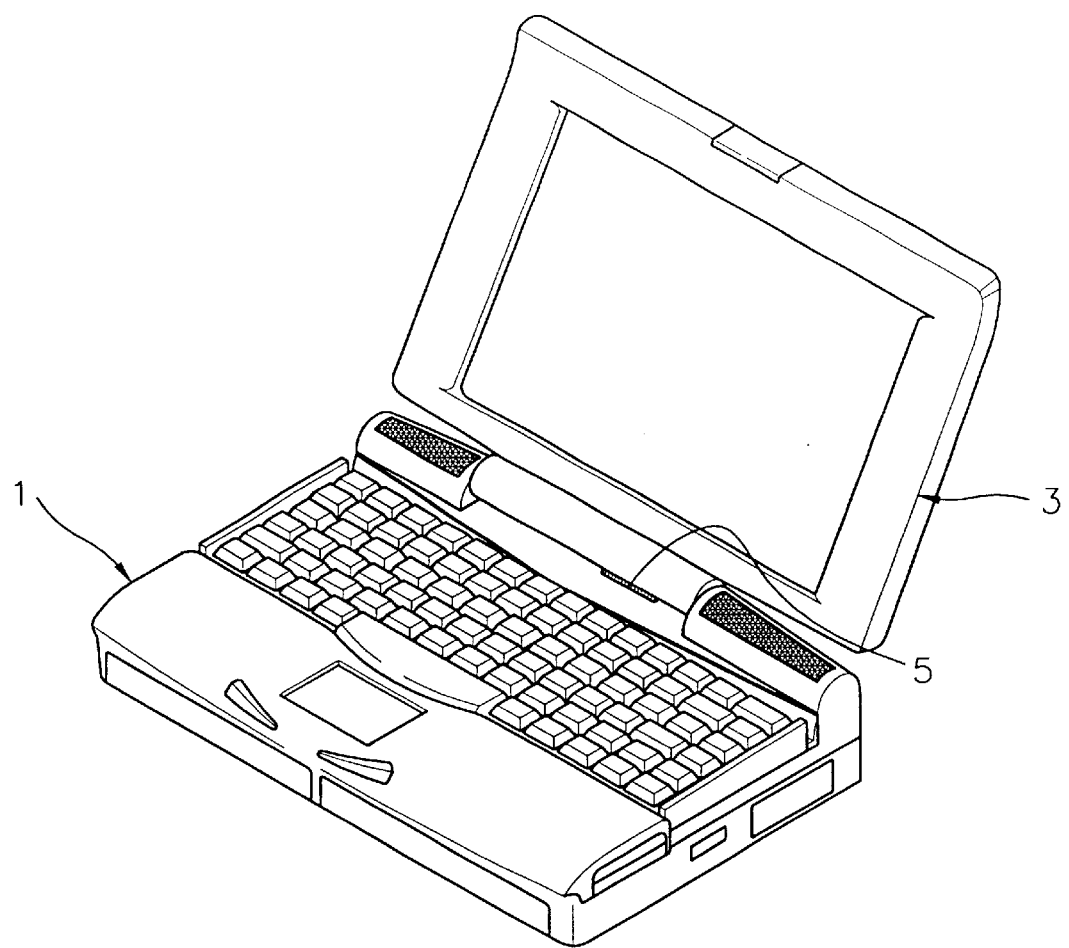
FIG. 1 is a perspective view illustrating a general notebook computer.
Figure 2:
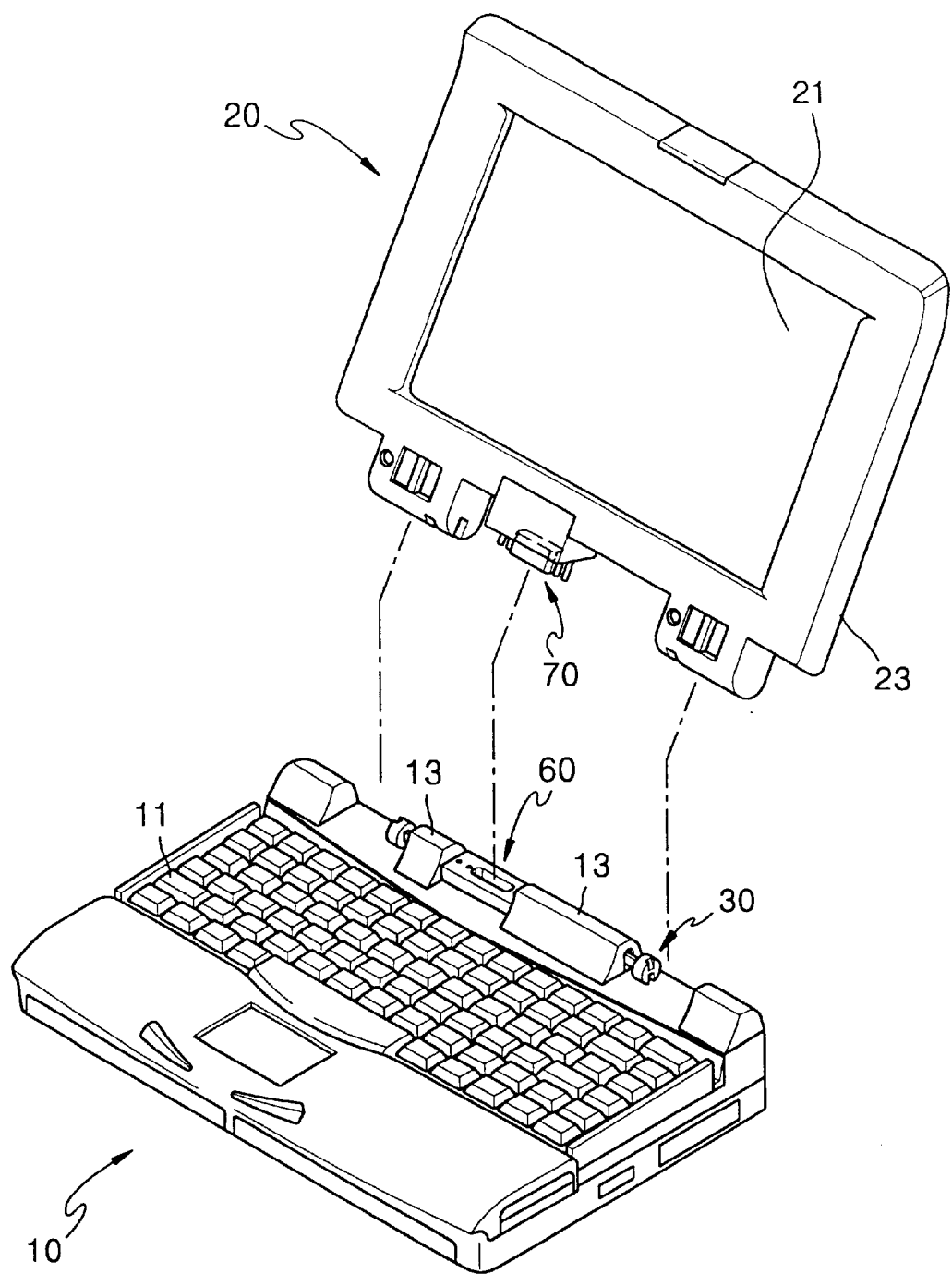
FIG. 2 is an exploded perspective view illustrating a display connector of an electronic device according to the present invention.
Figure 3:
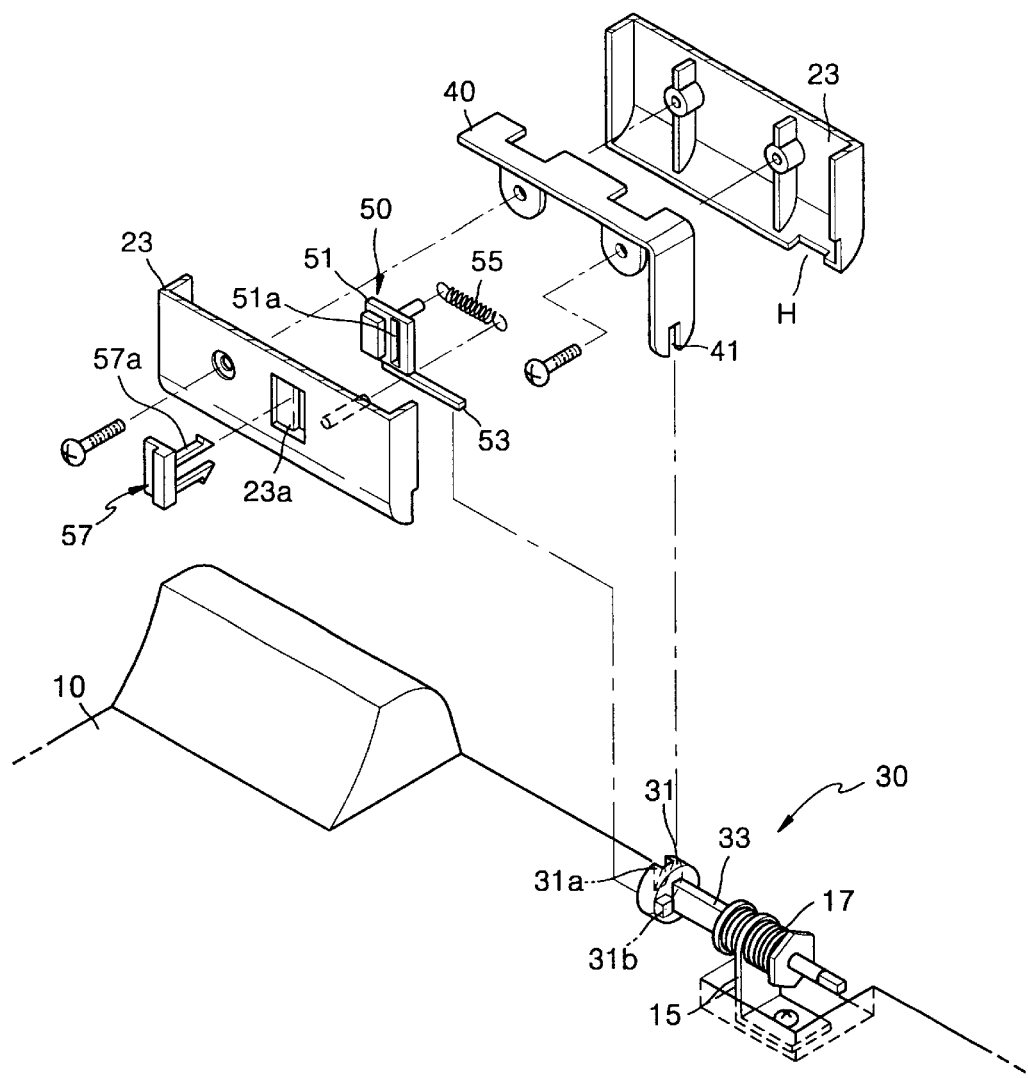
FIG. 3 is an exploded perspective view illustrating essential parts of FIG. 2.

Referring to FIGS. 2 and 3, a display connector of an electronic device according to the present invention includes a body 10 having a mounting portion 13 and a display member 20.

The mounting portion 13 protrudes from one surface of the body 10 having input keys 11. A pair of rotation pins 30 are rotatably installed at both sides of the mounting portion 13. Preferably, the rotation pins 30 are installed in support brackets 15 installed in the body 10. It will be understood that "installed in the body" is used to mean that the pins are installed with respect to the body, and includes situations in which the pins are completely in the body, partially in the body, or on the body but not precisely in it. Also, a plurality of friction members 17 are installed between each rotation pin 30 and its support bracket 15. The friction members 17 provide a frictional force to the rotation pin 30, thereby suppressing free rotation of the rotation pin 30.

Also, either of the pair of rotation pins 30 is coupled to a light emitting module 60 to be described later. One end of the rotation pin 30 coupled to the light emitting module 60 has a non-circular cross section, e.g., rectangular cross section, and is coupled to the light emitting module 60. Thus, the rotation pin 30 and the light emitting module 60 can be integrally rotated. Also, a guide groove 31a and a locking groove 31b are formed in a head 31 provided at the other end of the rotation pin 30. The rotation pin 30 has a fastening portion 33 having a rectangular cross section at a portion adjacent to the head 31.

The rotation pin 30 having the aforementioned configuration functions to rotatably support the display member 20 and to support the light emitting module 60. Thus, separate elements for supporting the light emitting module 60 or the display member 20 are not necessary, thereby reducing the number of elements.

The display member 20 includes a panel 21 for receiving a picture signal from the body 10 and displaying the same, and a case 23 for supporting the panel 21. The fixing bracket 40 is accommodated within the case 23 and exposed outside through a through-hole H formed in the case 23. Also, the fixing bracket 40 is bent toward the rotation pin 30 and has a fastening groove 41 formed at an end corresponding to the through-hole H. When the body 10 and the display member 20 are connected, the fastening groove 41 and the fastening portion 33 are coupled relative to each other. Thus, the fixing bracket 40 is capable of rotating along with the rotation pin 30.

Locking means for maintaining a fastened state between the rotation pin 30 and the fixing bracket 40, and unlocking means for releasing the fastened state, are installed inside the case 23. It will be appreciated that the locking means and unlocking means may, for convenience, also be referred to collectively as a lock which may be locked or unlocked.

The locking means includes a locking member 50 and a spring 55. The locking member 50 is movably installed within the case 23 to be selectively locked to or unlocked from the locking groove 31b. The locking member 50 includes a body 51 having a connection hole 51a and a locking rod 53 protruding from the body 51 toward the head 31. The locking member 50 moves between a first position and a second position. Here, the first position is where the locking member 50 is positioned when the locking rod 53 and the locking groove 31b are connected to each other, and the second position is where the locking member 50 is positioned when the locking rod 53 and the locking groove 31b are disconnected from each other. The spring 55 is installed in the case 23, and elastically presses the locking member 50 toward the first position. Thus, the separation of the locking member 50 and the rotation pin 30 is prevented by the force of the spring 55.

The unlocking means includes a guide hole 23a formed in the case 23 and an unlocking lever 57. The unlocking lever 57 is slidably installed in the guide hole 23a, and is partially exposed outward through the guide hole 23a. Also, the unlocking lever 57 has a pair of hooks 57a inserted into the connection hole 51a to be connected. Thus, the unlocking lever 57 is manually moved by a user so as to move the locking member 50 to the first and second positions.

Figure 4:
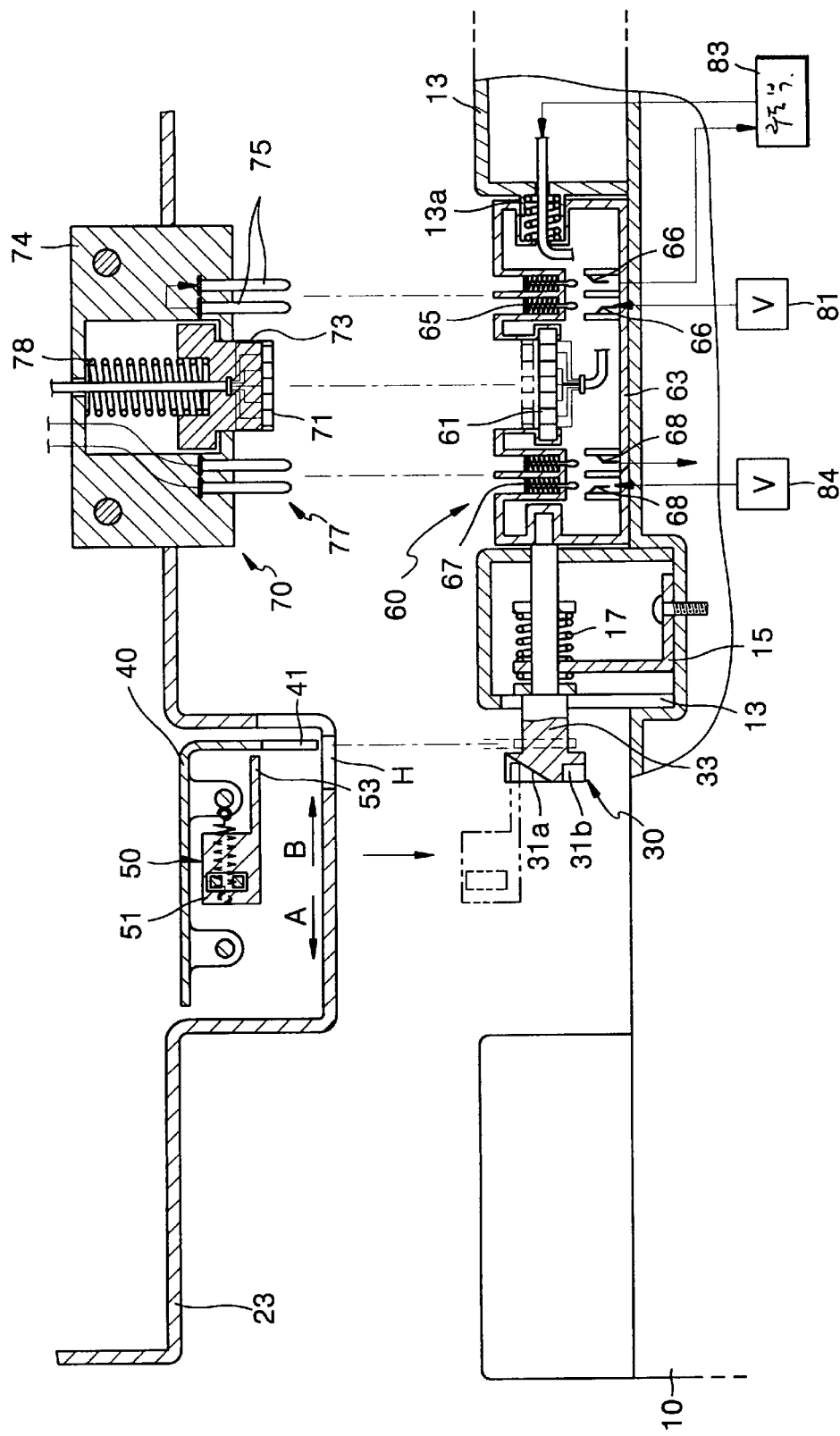
FIG. 4 is a cross-sectional view partially illustrating a disconnected state of the display connector shown in FIG. 2.

The light emitting module 60 is installed in the mounting portion 13 to be positioned between the rotation pins 30. When the body 10 and the display member 20 are connected, the light emitting module 60 is coupled relative to a light receiving module 70 to be described later. Referring to FIG. 4, the light emitting module 60 is supported by the rotation pin 30 and the mounting portion 13. In other words, one end of the light emitting module 60 is supported by the rotation pin 30 and the other end thereof is rotatably connected to a shaft 13a provided at the mounting portion 13. Thus, the light emitting module 60 can be rotated along with the rotation pin 30.

Also, the light emitting module 60 includes a laser diode array 61 for independently radiating light according to a driving signal, and a first holder 63 connected to the rotation pin 30, for supporting the laser diode array 61. The laser diode array 61 includes a plurality of laser diodes. When the display member 20 is mounted on the body 10, the laser diode array 61 is driven by applying current to first electrodes 65 and 75 provided at the light receiving module 70 and the first holder 63 to then irradiate light. Also, when the body 10 and the display member 20 are disconnected, the laser diode array 61 stops operating by disconnection of the first electrodes 65 and first switches 66 provided at the light emitting module 60 and the first holder 63. The first switches 66 are electrically connected to an auxiliary power source 81 and a driver 83 of the laser diode array 61. Also, second electrodes 67 for electrically connecting the body 10 and the display member 20 during connection, are provided in the first holder 63. One ends of the second electrodes 67 are selectively connected to or disconnected from second switches 68 connected to a main power source 84 according to connection or disconnection of the body 10 and the display member 20. The other ends of the second electrodes 67 provided in the first holder 67 are connected to a second electrode 77 provided in the light receiving module 70 when the body 10 and the display member 20 are connected.

The light receiving module 70 includes a photo diode array 71 for receiving light radiated from the laser diode array 61, a second holder 73 for supporting the photo diode array 71 and a housing 74 installed in the case 23, for movably accommodating the second holder 73. The photo diode array 71 includes a plurality of photo diodes for independently performing photoelectric conversion on incident light. When the body 10 and the display member 20 are connected, the photo diode array 71 faces the laser diode array 61 and is spaced apart by a predetermined distance. Also, an elastic member 78 is further installed within the housing 74 and elastically presses the second holder 73 outward. The second electrode 77 protrudes at the exterior side of the housing 74 toward the light emitting module 60.

The display connector of an electronic device having the aforementioned configuration operates as follows.

First, in order to connect the display member 20 to the body 10, in a state as shown in FIG. 4, the display member 20 is made to approach the body 10. Then, the locking rod 53 is brought into contact with the guide groove 31a to be pushed away in a direction indicated by 'A'. Then, if the locking rod 53 faces the locking groove 31b, the locking rod 53 is restored into its original place in a direction indicated by 'B' to be coupled to the locking groove 31b. Simultaneously, the fastening groove 41 of the fixing bracket 40 is connected to the fastening portion 33 of the rotation pin 30. Also, the light emitting module 60 and the light receiving module 70 are connected such that the respective diode arrays 61 and 71 face each other and are spaced apart from each other by a predetermined distance. Thus, the light emitting module 60 and the light receiving module 70 are aligned so as to allow light transmission therebetween. In other words, at the same time the body 10 and the display member 20 are connected, the respective first electrodes 65 and 75 are connected. The first electrodes 65 are also connected to the first switches 66. The laser diode array 61 receives power from the auxiliary power source 81 to then be driven, and radiates light. Also, the second electrodes 67 and 77 are connected to each other. Thus, the body 10 and the display member 20 are electrically connected to turn on the panel 21.

As described above, the display member 20 mounted on the body 10 is rotatable with respect to the body 10 around the rotation pin 30. Also, the light emitting module 60 connected with the rotation pin 30 is simultaneously rotated in a state in which it is connected to the light receiving module 70. Also, transmission of picture signals is allowed between the respective modules 60 and 70 even during rotation.

When the display member 20 is intended to be disconnected from the body 10, the locking member 50 is pushed away in the 'A' direction. Then, the locking rod 53 is separated from the locking groove 31b. In such a state, the display member 20 is separated from the body 10 in the opposite direction to the direction of connection. Then, the fastening portion 33 is separated from the fastening groove 41 and the light emitting module 60 and the light receiving module 70 are also disconnected. If the display member 20 is separated from the body 10, the panel 21 of the display member 20 is turned off. Also, the laser diode array 61 stops operating. Thus, in a state in which the laser diode array 61 is exposed to the outside, light is prevented from being radiated therefrom. Thus, the user's safety can be ensured. Further, since a power source between the body 10 and the display member 20 is blocked, power loss can be reduced.

When the body 10 and the display member 20 are completely disconnected from each other, the light emitting module 60 is maintained in a state in which it rotates along with the rotation pin 30 in a predetermined positional relationship. Thus, it is not necessary to realign the rotation pin 30 and the light emitting module 60 when the display member 20 is again connected to the body 10. In other words, even if the rotation angle between the rotation pin 30 and the light emitting module 60 is not adjusted, the respective modules 60 and 70 are automatically aligned during connection of the fixing bracket 40 and the rotation pin 30.

As described above, the display connector of an electronic device according to the present invention is configured such that a display member can be easily attached to or detached from a body.

Therefore, in the display connector according to the present invention, the display member can be replaced with a new one perhaps having better resolution and/or a larger screen. Also, the display connector can be easily carried. Further, in the case where either the body or the display member is defective or used up, it can be easily replaced. Also, since a picture signal is transmitted using light, electromagnetic interference can be reduced. Further, since the display member and a light emitting module are rotatably supported by a single rotation pin, the position of the light emitting module can be easily adjusted. Finally, due to reduction in the number of elements, the manufacturing cost can be reduced.

What is claimed is:

1. An electronic device with a display connector, comprising:

a body having a mounting portion;

a display member responsive to a picture signal to display a corresponding image, detachably installed with respect to said body;

a pair of rotation pins rotatably installed in said mounting portion;

a pair of fixing brackets provided in said display member to correspond to said rotation pins and coupled to said rotation pins when said display member and said body are connected so as rotate along with said rotation pins;

means for maintaining connection between said fixing brackets and said rotation pins, defining locking means;

means for canceling connection between said fixing brackets and said rotation pins, defining unlocking means;

a light emitting module coupled to one of said rotation pins to be rotated therewith, and having a laser diode array for independently radiating light according to a driving signal; and a light receiving module, installed in said display member, receiving said picture signal as light from said light emitting module when said display member is mounted on said body.

2. The electronic device according to claim 1, wherein said locking means comprises:

a locking groove formed in a head of said rotation pin;

a locking member movably installed in said display member to move toward and couple to said locking groove when said display member is connected to said body; and a spring for elastically pressing said locking member toward said locking groove.

3. The electronic device according to claim 2, wherein said unlocking means comprises:

a guide hole formed in said display member and an unlocking lever having one end coupled to said locking member and another end slidably installed in said guide hole.

4. The electronic device according to claim 1, wherein said mounting portion protrudes from one plane of said body, and said rotation pins are symmetrically installed at both ends of said mounting portion.

5. The electronic device according to claim 1, wherein said light emitting module is installed between said pair of rotation pins.

6. The electronic device according to claim 1, wherein each of said rotation pins has a predetermined fastening portion having a rectangular cross section at one end, each of said fixing brackets has a predetermined fastening groove formed to correspond to the shape of said cross section of said fastening portion, and said rotation pin and said fixing bracket rotate together in a state where said fastening portion and said fastening grooves are connected.

* * * * *